(12) United States Patent
Matthews et al.

(10) Patent No.: US 7,349,957 B1
(45) Date of Patent: Mar. 25, 2008

(54) NETWORK MANAGEMENT METHOD AND TOOL

(75) Inventors: Thomas Matthews, Fairfax Station, VA (US); Alex J. Alexander, Great Falls, VA (US)

(73) Assignee: Smith Micro Software, Inc., Herndon, VA (US)

( * ) Notice: Subject to any disclaimer, the term of this patent is extended or adjusted under 35 U.S.C. 154(b) by 584 days.

(21) Appl. No.: 10/084,913

(22) Filed: Mar. 1, 2002

Related U.S. Application Data

(60) Provisional application No. 60/272,045, filed on Mar. 1, 2001.

(51) Int. Cl.
*G06F 15/16* (2006.01)
*G06F 15/173* (2006.01)

(52) U.S. Cl. ............................. 709/223; 707/4; 707/10; 707/103

(58) Field of Classification Search ................ 709/162, 709/217–224, 227, 249, 201, 315, 332; 370/241, 370/230; 455/423; 713/162; 340/539; 710/29; 705/1; 714/46, 47
See application file for complete search history.

(56) References Cited

U.S. PATENT DOCUMENTS

| | | | | |
|---|---|---|---|---|
| 5,918,015 A | * | 6/1999 | Suzuki et al. ............... | 709/219 |
| 6,070,070 A | * | 5/2000 | Ladue ........................ | 455/419 |
| 6,477,590 B1 | * | 11/2002 | Habusha et al. ............... | 710/29 |
| 6,519,635 B1 | * | 2/2003 | Champlin et al. ........... | 709/223 |
| 6,567,937 B1 | * | 5/2003 | Flores et al. .................. | 714/46 |
| 6,654,801 B2 | * | 11/2003 | Mann et al. ................ | 709/224 |
| 6,704,768 B1 | * | 3/2004 | Zombek et al. ............. | 709/201 |
| 6,718,173 B1 | * | 4/2004 | Somani et al. ........... | 455/456.1 |
| 6,735,630 B1 | * | 5/2004 | Gelvin et al. ............... | 709/224 |
| 6,766,165 B2 | * | 7/2004 | Sharma et al. .............. | 455/423 |
| 6,782,474 B1 | * | 8/2004 | Ylonen ....................... | 713/162 |
| 6,826,718 B1 | * | 11/2004 | Wu ............................. | 714/46 |
| 6,859,831 B1 | * | 2/2005 | Gelvin et al. ............... | 709/224 |
| 6,912,502 B1 | * | 6/2005 | Buddle et al. ................. | 705/1 |

\* cited by examiner

*Primary Examiner*—David Wiley
*Assistant Examiner*—Jude J Jean-Gilles
(74) *Attorney, Agent, or Firm*—Arent Fox LLP

(57) ABSTRACT

A method for providing network management using a remote device. The method may include receiving an end-user message from an end-user device configured to communicate with a network management tool and processing the received message to perform a network management function on at least one network component. The end-user device may include one of a plurality of wireless devices, and the network management tool is configurable to communicate with any of the plurality of wireless devices.

14 Claims, 5 Drawing Sheets

NETWORK MANAGEMENT METHOD AND TOOL

CROSS-REFERENCE TO RELATED APPLICATIONS

The present application claims benefit of co-pending U.S. provisional application Ser. No. 60/272,045 filed Mar. 1, 2001.

FIELD OF THE INVENTION

The invention is generally related to networks. More particularly, the invention is related to network management.

BACKGROUND OF THE INVENTION

Today, organizations increasingly rely on their computer networks for day-to-day operations, since networks are the backbone of large and medium sized organizations. To maintain network health, companies may spend vast amounts of money to acquire expensive network management solutions. Network management is the process of managing connections that exist between computers. Network management may include installation, administration and maintenance of a network operating system, cables, servers, routers and wide-area networks, as well as printers and other peripherals.

One responsibility for network administrators is to keep their networks up and running at all times. Several conditions may result in a network outage, including a switch interface going down, a break in the network cabling, network congestion, etc. Network management solutions are useful, so long as the Network Administrator (NA) or a Network Engineer is available at their console to solve future or present critical network conditions, should problems arise.

When a network problem occurs, a company may suffer heavy losses, depending on the scale of the problem, if the NA or engineer is not able to communicate with network components. For example, if a router goes down in Chicago while the NA is at a soccer game in California, the NA may be unable to respond to the problem if the NA can not get to a console.

SUMMARY OF THE INVENTION

A method for providing network management using a remote device is described. The method may include receiving an end-user message from an end-user device configured to communicate with a network management tool and processing the received message to perform a network management function on at least one network component. The end-user device may include one of a plurality of wireless devices, and where the network management tool is configurable to communicate with any of the plurality of wireless devices.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to obscure unnecessarily the invention.

A wireless network management tool ("NM tool") is described. In one embodiment, the NM tool provides users with the ability to remotely monitor and maintain business-critical network infrastructure from virtually any wireless device. The NM tool allows users, such as engineers and administrators, to address network-related problems anytime, from anywhere, over any wireless device and network. Thus, users may be able to more productively use the infrastructure they already have.

Figure 1:
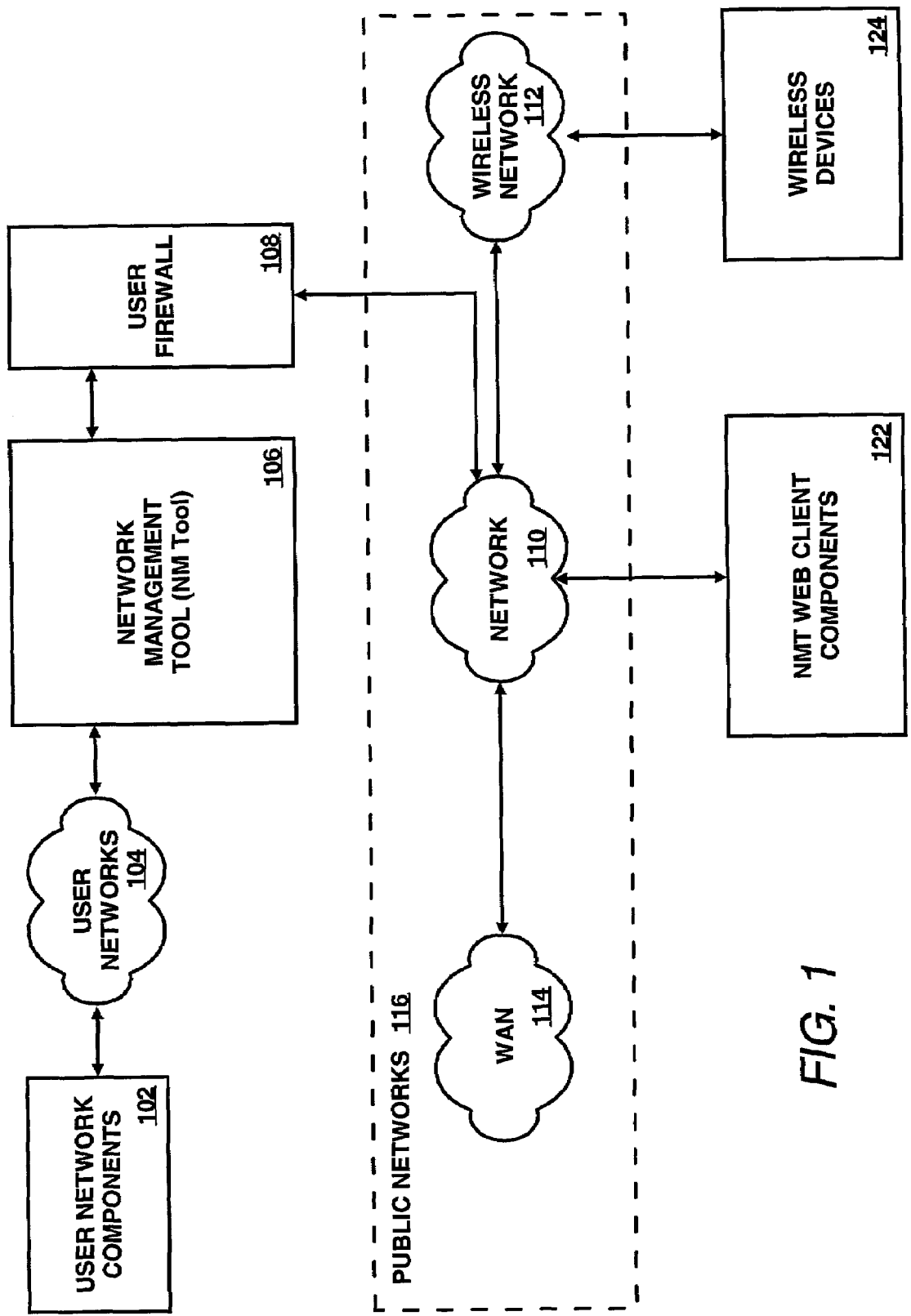
FIG. 1 is a block diagram illustrating one embodiment of a network including a network management tool.

FIG. 1 is a block diagram illustrating one embodiment of a network including NM tool 106. NM tool 106 may be coupled to user network components 102, which may include private network components, through user networks 104, which may include, for example, a LAN or a WAN.

NM tool 106 may also be coupled to public networks 116 through user firewall 108. For example, NM tool 106 may be connected to network 110, such as the Internet, through user firewall 108. User firewall 108 may be of any known configuration. For example, user firewall 108 may include a port for HTTP, a configurable port for TCP/IP, a SMTP Relay (outbound) Rule, a port for POP3 rule, and a port for IMAP rule.

NM Tool 106 may be a stand-alone plug and play software application that allows for secure remote wireless control and monitoring of user network components 102, which may include relational databases. The NM tool 106 may be device agnostic and network agnostic, allowing full control, through any network, of any wireless device that may be manipulated or monitored through Telnet or SNMP commands.

Network 110 may further be coupled to other private networks, such as WAN 114, wireless network 112, and NM Tool web client components 122, which may include wired computers, allowing users, such as administrators or engineers to access network components 102 through the NM tool 106.

Wireless network 112 may be coupled to one or more wireless devices 124. Wireless devices 124 may include end-user devices such as client-less devices, not having an operating system, such as WAP phones, session-based devices, including PDAs such as PALM, POCKET PC, and J2ME, and paging or wireless-email devices, such as RIM, BLACKBERRY, or PAGEWRITER using P935. Wireless devices 124 may include any wireless handheld device or fixed wireless device, allowing users to access network components 102 through the NM tool 106.

Figure 2:
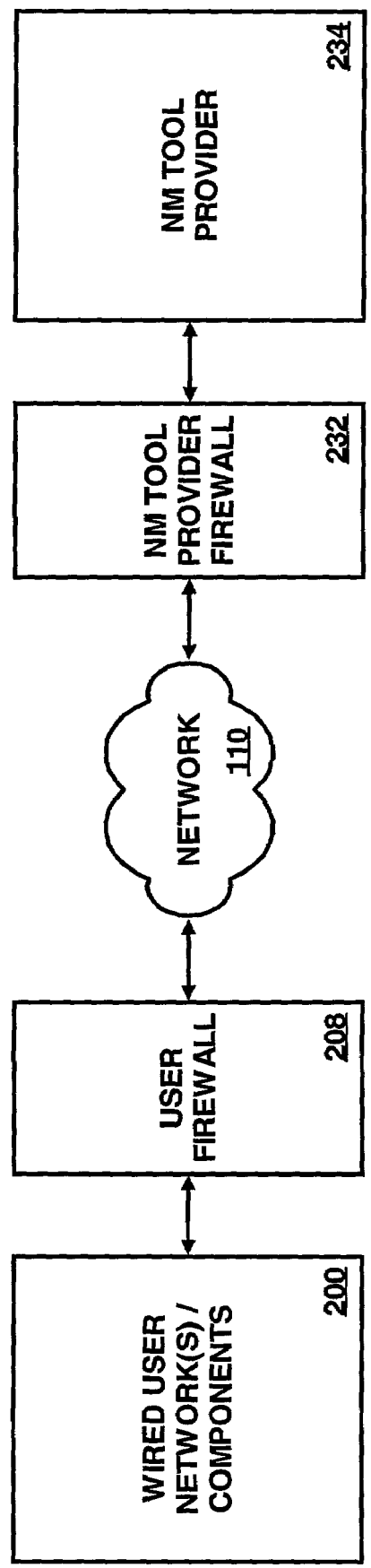
FIG. 2 is a block diagram illustrating one embodiment of a network offering installation of the network management tool of FIG. 1.

FIG. 2 is a block diagram illustrating one embodiment of a network offering installation of NM tool 106 of FIG. 1. NM tool 106 may be a wired-to-wireless application. On the wired side, NM tool 106, which may include a web client written in Java, may be downloaded onto any platform behind user firewall 208. The platform onto which NM tool 106 may be downloaded may include a server or other network component running any Microsoft or Unix platforms. In one embodiment, NM Tool 106 may be integrated into a LDAP directory.

NM tool provider 234 may include automated customer support service ("CSS") behind NM tool provider firewall 232. The CSS may include product activation, wireless activation and user activation. The product activation may include an installer that installs NM tool 106 on any user server. The user server may include any server running any platform, including WINDOWS NT, WINDOWS 2000, WINDOWS 2000 AS, SOLARIS 7, SOLARIS 8, etc. Upon successful installation and activation, the configured server may act as a proxy between wireless hand-held devices and user network(s) and components 200. NM Tool 106 installation may require a user to obtain SSL Web Server certificate for secure transactions for both WAP implementation and the utilization of NM Tool 106 web client external to user firewall 208.

As a secondary security layer, NM tool 106 may be used to record every command and its result for a user of the NM Tool 106. The web client may also allow performing administrative functions, such as profile management and access control. Also, by permitting users to create macros, command shortcuts and favorites on the wired side, and execute them with a few keystrokes on wireless devices 124, NM tool 106 allows performance of a wide range of functions despite the difficulties of data entry and screen size of handheld wireless devices 124.

Figure 3:
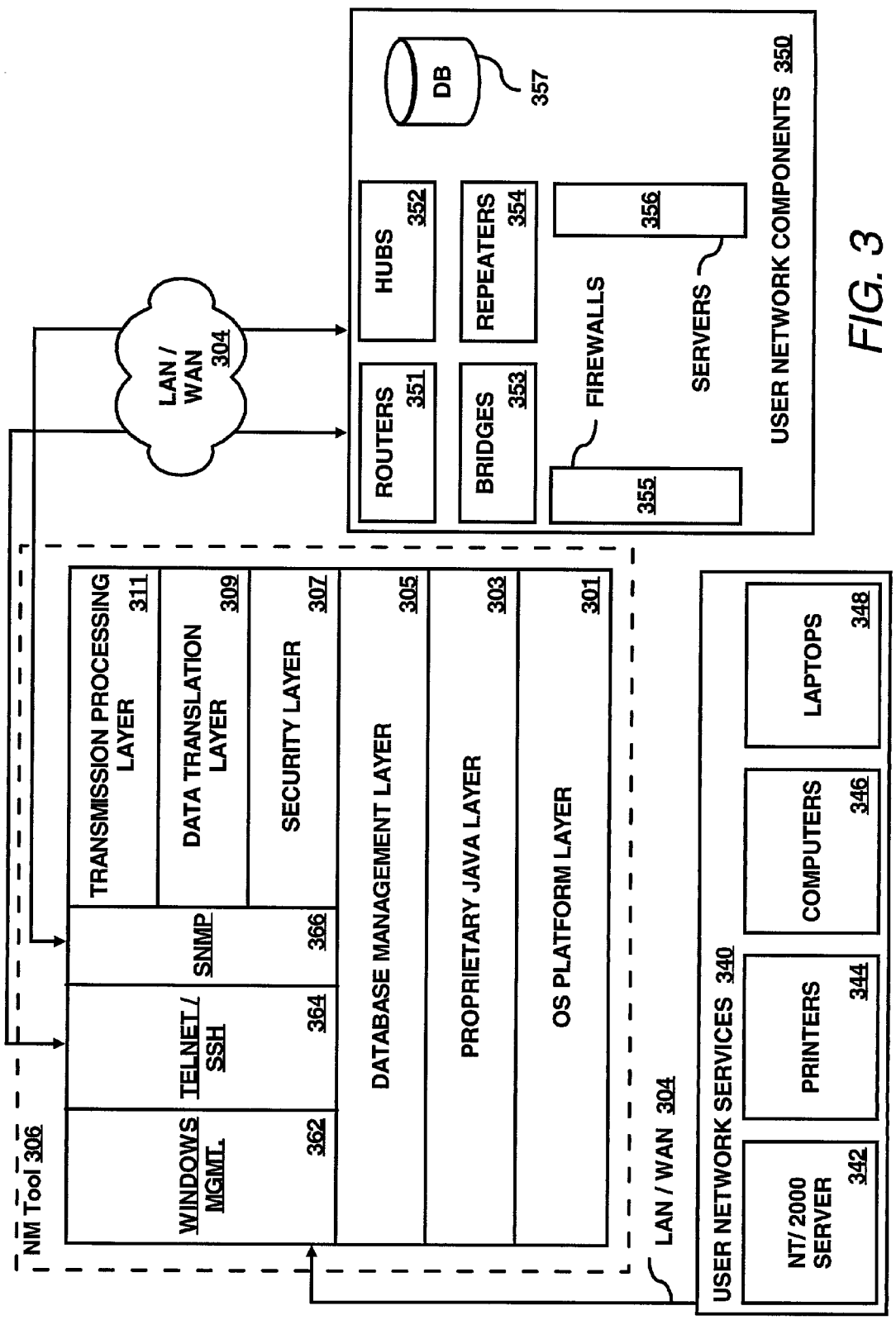
FIG. 3 is a block diagram illustrating one embodiment of the network management tool of FIG. 1.

FIG. 3 is a block diagram illustrating one embodiment of the NM tool 106 of FIG. 1. As illustrated in FIG. 3, the NM tool 306 may be designed and developed based on wired, distributed objects using embedded wireless middleware and applications.

The NM tool 306 may include a plug-ins 362, 364 and 366 on a platform engine that is compatible with existing structure of a user entity, such as an enterprise, and the already-owned wireless device of a user within the enterprise. Any application that exists in the "wired" world may be made wireless by NM tool 306 through its platform engine, while other wireless only applications may also be developed.

The platform engine of the NM tool 306 may include operating system ("OS") platform layer 301, proprietary Java layer 303, database management layer 305, security layer 307, data translation layer 309 and transmission processing layer 311. OS platform layer 301 may allow compatibility with any user enterprise platform, such as MICROSOFT, UNIX OR mainframe platforms. Proprietary Java layer 303 may include Java mail, J2EE for servlets, Java APIs, JNI, JNDI, Java Database Connectivitys (JDBCs), JMS, JAXP and Java beans as well as JVM. JAVA MAIL CLIENT may be designed to support wireless two-way messaging devices such as RIM, MOTOROLA TIMEPORT P935, etc. JAVA MAIL CLIENT may retrieve SMTP messages from POP3/IMAP4 a NM Tool 306 user clearing account, extract commands, parse messages from the clearing account, confirm user authorization, command validation and command syntax, and relay commands to a network device, then back to a wireless user. If a firewall is installed between a NM Tool 306 server and a user mail server, then a network administrator may verify that certain ports are open for communication with the NM Tool server, such as SMTP access to the user mail server, and POP3 and IMAP access to the user mail server.

Database management layer 305 may include compatibility with NM tool 306 proprietary databases, which may include MYSQL, as well as external databases. An event logging mechanism may record and maintain information in a MYSQL database about all activities passing through NM tool 306. The platform engine includes the ability to access and perform various functions to any databases using the JDBCs. To communicate with non-relational, relational, and object relational databases, NM Tool 306 may use either its proprietary middleware layer through a web server or JDBC APIs where a Java applet may communicate directly with the database systems preparing and executing SQL statements and terminating the session.

Security layer 307 may include a 128-bit RC4 compliant encryption for all airborne packets as well as third party vendor plugin APIs. Thus, NM Tool 306 may support almost any wireless encryption protocol a user desires, including ECC by CERTICOM and TRIPLE DES. In one embodiment, WAP phone devices, which are clientless devices, may initiate a WAP URL request to the phone company's WAP gateway. This flow may be protected by the WAP Transport Layer Security ("WTLS") Protocol. The WAP gateway may decrypt the message and encrypt it again as an SSL message to the NM Tool 306 server, which may invoke a NM Tool 306 servlet to handle the request.

Data translation layer 309 may be used to handle all on demand or on the fly translations for SOAP/XML, HTML and NM Tool provider 234 proprietary translations. Transmission processing layer 311 may include SMTP, HTTP and NM Tool provider 234 proprietary transmission processing.

The plug-ins may include windows management ("WM") application module 362, Telnet/SSH application module 364 and SNMP application module 366. Administration of wireless devices 124 may be performed through plug-ins 362, 364, 366.

WM module 362 may be coupled to user network services 340 through user networks, such as LAN/WAN 304. User network services 340 may include a user platform server 342, peripherals such as printers 344, computers 346 and laptops 348. WM module 362 may be used by administrator or engineer users ("admins") to perform administrative functions. For example, admins may start a service, stop a service, look at who is privileged on which peripheral, etc. from a wireless device 124 through WM module 362.

WM module 362 may be based on ACTIVE DIRECTORY and WINDOWS MANAGEMENT INSTRUMENTATION ("WMI"). ACTIVE DIRECTORY, which is an essential component of the WINDOWS 2000 architecture, presents organizations with a directory service designed for distributed computing environments. ACTIVE DIRECTORY allows organizations to centrally manage and share information on network resources and users while acting as the central authority for network security. In addition to providing comprehensive directory services to a WINDOWS environment, ACTIVE DIRECTORY is designed to be a consolidation point for isolating, migrating, centrally managing, and reducing the number of directories that companies require.

WMI is a key component of WINDOWS management services. WMI is a WINDOWS-based implementation of the Distributed Management Task Force ("DMTF") Web-Based Enterprise Management ("WBEM") initiative, an initiative that establishes management infrastructure standards and provides a way to combine information from various hardware and software management systems.

WM module 362 may allow an entity to perform NT administration tasks upon computers, users, groups, and printers. Some of the activities that may be accomplished from wireless devices 124 may include:

For Computers
View Computer Information
Manage Service status and startup type, start/stop/pause/resume services
Manage TCP/IP settings (e.g., static vs. dynamic ip addressing)
View Event logs
Reboot, shutdown computers
View/run/terminate processes
For Users
Disable/enable user accounts
Change passwords
For Groups
Manage Group membership
For Printers
View print queue
Cancel print job
Re-prioritize print jobs Telnet/SSH module 364 and SNMP application module 366 may be coupled through LAN/WAN 304 to User Network Components 350. User Network Components 350 may include one or more routers 351, one or more hubs 352, one or more bridges 353, one or more repeaters 354, one or more firewalls 355, one or more servers 356 and one or more databases 357.

Telnet/SSH module 364 may allow dedicated, secure, wireless Telnet sessions for network diagnosis and troubleshooting. Macros for creating and storing commonly used commands may be stored in Telnet/SSH module 364 allowing fast and easy lookup and execution. Telnet/SSH module 364 may allow for automatic retention of a predetermined number of commands and associated results issued from a particular wireless device. For example, the last 15 commands and associated results issued from a particular wireless device may be retained by Telnet/SSH module 364. A view log session function may also be available through Telnet/SSH module 364, allowing performance of permission-based queries on archived commands and their associated results.

SNMP module 366 may include functionality allowing creating and sharing of SNMP command favorites and shortcuts, alert notification, a MIB parser and a MIB browser for dynamic management of SNMP commands and support for SNMP versions 1 and 2. SNMP module 366 may also include automatic retention of a predetermined number of commands and associated results, such as the last 50 commands and associated results, issued from a particular wireless device. SNMP module 366 may further include the view log session function, allowing performance of permission-based queries on archived commands and their associated results.

Inclusion of the three plug-in modules 362, 364, 366 in NM Tool 306 allows users to use the troubleshooting tool of their choice in almost any wireless environment. Each user and each wireless device 124 of each user may be registered and given authorizations by a network administrator using the NM Tool 306 web client before any authentication takes place. Registration may include a user name, password, wireless device type and respective address.

Thus, a user may access the NM Tool 306 only through registered devices 124, and perform only functions that the user is authorized to perform. Each device 124 must also be configured by the network administrator. Thus, all devices 124 are assigned and all users are protected. Further, all idle sessions may be configured to time out after a predetermined amount of time, such as 30 minutes, allowing an additional layer of security if the device 124 is left unattended. Another inherent security and management feature is the logging of every command and its result for a NM Tool 306 user, providing comprehensive audit trail capabilities.

Figure 4:
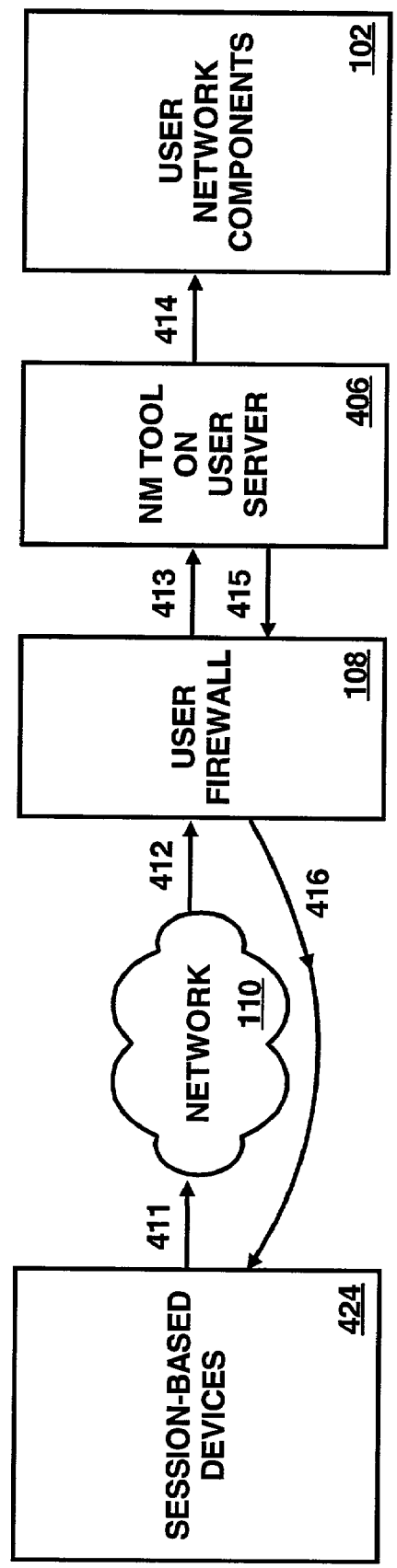
FIG. 4 is a block diagram illustrating one embodiment of operation of the network management tool of FIG. 1 with session-based wireless devices.

FIG. 4 is a block diagram illustrating one embodiment of operation of the NM tool 106 of FIG. 1 with session-based wireless devices 424. Session-based wireless devices 424 may include PDAs, such as PALM, Pocket PC or J2ME phones. Session-based devices 424 communicate via the 128-bit RC4 private key encryption to NM Tool server 406 that resides behind user firewall 108. Using the TCP/IP application, all Internet and airborne bound messages may be encrypted from either the wired or the wireless sides.

At arrows 411-412, session-based device 424 sends the RC4 128-bit encrypted message. At arrow 413, user firewall 108 forwards the message to NM tool server 406. At arrow 414, NM tool server 406 decrypts and processes the message by forwarding it to user network components 102. At arrows 415-416, NM tool server 406 replies with a RC4 128-bit encrypted message.

Figure 5:
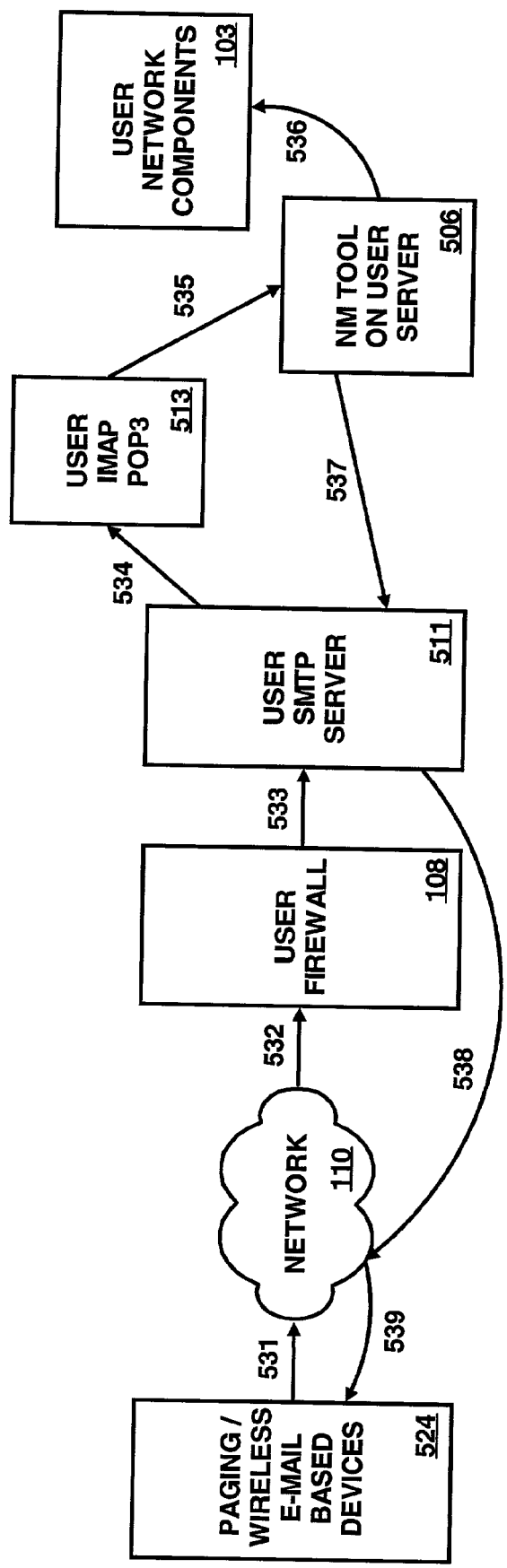
FIG. 5 is a block diagram illustrating one embodiment of operation of the network management tool of FIG. 1 with paging or wireless e-mail based devices.

FIG. 5 is a block diagram illustrating one embodiment of operation of the NM tool 106 of FIG. 1 with paging or wireless email-based devices 524. Paging or wireless email-based devices 524 may include RIM and MOTOROLA PAGEWRITER 2Way Pager. Devices 524 may communicate via the 128-bit RC4 private key encryption to NM tool Server 506 residing behind user firewall 108. Utilizing the SMTP and POP 3 protocols, all Internet and airborne bound messages are encrypted from either the wired or the wireless sides.

At arrows 531-532, device 524 may send an RC4 128-bit encrypted message or email. At arrows 533-534, SMTP server 511 may receive the email and deliver it to IMAP/POP3 server 513. At arrows 535-536, NM tool server 506 may pull down the email, and decrypt and process the email by forwarding it to user network components 102. At arrows 537-539, NM tool server 506 may reply with a RC4 128-bit encrypted message through SMTP server 511.

NM tool 106, 306 may be compiled into computer programs (e.g., software applications downloaded into a server). These computer programs can exist in a variety of forms both active and inactive. For example, the computer program can exist as software comprised of program instructions or statements in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention, which is intended to be defined by the following claims—and their equivalents—in which all terms are meant in their broadest reasonable sense unless otherwise indicated.

What is claimed is:

1. A method for remote response and resolution of network and system failures, the method comprising:
   upon receiving notification of detecting a network or system failure, obtaining secure access to a client network infrastructure from a remote device, the client network infrastructure including a network management server;
   transmitting a remote device message to the network management server, the message comprising at least one instruction;
   at the network management server, translating each instruction into a series of commands that are executable against multiple network components;
   identifying and providing a resolution to the network or system failure;
   transmitting to the network management server the remote device message in a first format;
   converting the remote device message to a second format compatible with a network management protocol; and
   transmitting a message in the second format to at least one network component;
   wherein translating occurs via an updatable table that contains each instruction and the series of commands corresponding to the instruction.

2. The method of claim 1, wherein the remote device message is a network command.

3. The method of claim 1, wherein the remote device message is encrypted, the method further comprising:
   decrypting the message.

4. The method of claim 1, further comprising:
   receiving registration information, the registration information including user information and remote device information, wherein the registration information is usable in authenticating the remote device prior to communicating with the remote device.

5. A tool for remote response and resolution of network and system failures, the tool comprising:
   means for obtaining secure access to a client network infrastructure from a remote device upon receiving notification of a network or system failure, the client network infrastructure including a network management server;
   means for transmitting a remote device message to the network management server, the message comprising at least one instruction;
   translating means for translating each instruction into a series of commands that are executable against multiple network components;
   means for identifying and providing a resolution to the network or system failure,
   first transmitting means for transmitting to the network management server the remote device message in a first format;
   means for converting the remote device message to a second format compatible with a network management protocol; and
   second transmitting means for transmitting a message in the second format to at least one network component
   wherein the translating means comprises an updatable table that contains each instruction and the series of commands corresponding to the instruction.

6. The tool of claim 5, wherein the remote device message is a network command.

7. The tool of claim 5, wherein the remote device message is encrypted, the tool further comprising:
   means for decrypting the message.

8. The tool of claim 5, wherein the remote device is selected from a group consisting of a clientless wireless device, a session based wireless device, a paging wireless device, and an email-based wireless device.

9. The tool of claim 5, further comprising:
   means for receiving registration information, the registration information including user information and remote device information, wherein the registration information is usable in authenticating the remote device prior to communicating with the remote device.

10. A computer program product comprising a computer usable medium having control logic stored therein for causing a computer to remotely respond to and resolve network and system failures, the control logic comprising:
    first computer readable program code means for obtaining secure access to a client network infrastructure from a remote device upon receiving notification of a network or system failure, wherein the client network infrastructure includes a network management server;
    second computer readable program code means for transmitting a remote device message to the network management server, the message comprising at least one instruction;
    third computer readable program code means for translating each instruction into a series of commands that are executable against multiple network components; and
    fourth computer readable program code means for identifying and providing a resolution to the network or tool failure;
    fifth computer readable program code means for transmitting to the network management server the remote device message in a first format;
    sixth computer readable program code means for converting the remote device message to a second format compatible with a network management protocol; and
    seventh computer readable program code means for transmitting a message in the second format to at least one network component;
    wherein the third computer readable program code means comprises an updatable table that contains each instruction and the series of commands corresponding to the instruction.

11. The computer program product of claim 10, wherein the remote device message is a network command.

12. The computer program product of claim 10, wherein the remote device message is encrypted, the computer program product further comprising:

fifth computer readable program code means for decrypting the message.

13. The computer program product of claim 10, wherein the remote device is selected from a group consisting of a clientless wireless device, a session based wireless device, a paging wireless device, and an email-based wireless device.

14. The method of claim 1, further comprising:
  naming the series of commands; and
  providing the named series of commands as a menu item at the remote device;
  wherein selection of the menu item at the remote device results in execution of the series of commands at the network management server.

* * * * *